UNITED STATES PATENT OFFICE.

CONRAD SEMPER, OF PHILADELPHIA, PENNSYLVANIA, ASSIGNOR TO HARRISON BROTHERS & CO., OF SAME PLACE.

MANUFACTURE OF SULPHATE OF ALUMINA.

SPECIFICATION forming part of Letters Patent No. 280,088, dated June 26, 1883.

Application filed January 16, 1883. (No specimens.)

*To all whom it may concern:*

Be it known that I, CONRAD SEMPER, of Philadelphia, in the State of Pennsylvania, have invented a certain new and useful Process in the Manufacture of Sulphate of Alumina; and I hereby declare the following to be a full and exact description of the same.

In the manufacture of sulphate of alumina, the aluminous materials—such as schists, clays, &c.—are treated, as is well known, in the powdered state, either before or after roasting the same, with the requisite amount of either cold or hot sulphuric acid. In most cases a violent reaction will ensue and the aluminous material will be decomposed by the action of the acid, by which silica will be set free, and a combination of alumina, and of such other bases as may be present, formed with the sulphuric acid, whereby will be produced a more or less pure sulphate of alumina. This product may either be run into cakes, which, after hardening and after being more or less broken up, will form an article of commerce known as "aluminous cake;" or, after diluting said product formed by the treatment of aluminous materials with sulphuric acid with water, the silica may be allowed to settle, the clear supernatant liquor drawn off and boiled down, or concentrated to such a strength that it will get hard when cold. The product of each of these processes is the sulphate of alumina of commerce. Sulphate of alumina as usually made contains more or less free acid.

The object of my invention is to produce a neutral porous sulphate of alumina containing magnesia, for sizing and other purposes.

I am aware that porous sulphate of alumina, as well as sulphate of alumina containing magnesia, have heretofore been made.

My invention consists in producing sulphate of alumina of a neutral and porous character, which at the same time will contain magnesia, by the addition of a suitable quantity of carbonate of magnesia, or bicarbonate of magnesia, to a mixture of sulphuric acid and clay or other aluminous material, either before or after the silica is removed therefrom of such degree of concentration as that said aluminous solution when cold will harden into a cake. The amount of carbonate or bicarbonate of magnesia to be employed will be determined according to the acidity of the mass, and they are to be added to the concentrated aluminous solution while the same is hot and before it hardens into a cake, with the result that the mass will, during the process of hardening, be rendered porous by the escape of the gas derived from the decomposition of the carbonate or bicarbonate of magnesia employed, and at the same time, the product will be rendered neutral or slightly basic, and will be provided with sulphate of magnesia due to the combination of the acid present in the mass with the magnesia of the carbonate or bicarbonate of magnesia used in the process.

Having thus described my invention I claim—

The process of making a neutral porous sulphate of alumina, containing sulphate of magnesia, which consists in treating a hot solution of sulphate of alumina of such degree of concentration that it will harden when cold with carbonate or bicarbonate of magnesia, as specified.

In testimony whereof I have hereunto signed my name this 15th day of January, A. D. 1883.

CONRAD SEMPER.

In presence of—
W. C. STRAWBRIDGE,
J. BONSALL TAYLOR.